June 18, 1968  M. E. OLDWEILER  3,389,076
FLUID SOLIDS TRANSPORT
Filed June 30, 1966
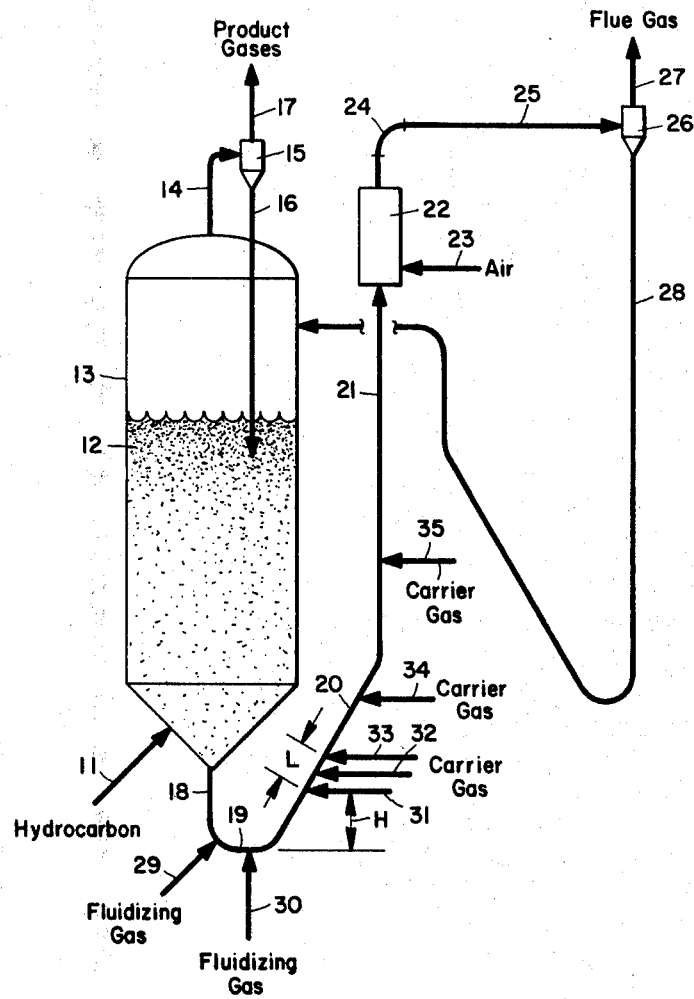
M. E. OLDWEILER   INVENTOR United States Patent Office 3,389,076
Patented June 18, 1968

3,389,076
FLUID SOLIDS TRANSPORT
Morey E. Oldweiler, Whippany, N.J., assignor to Esso Research and Engineering Company, a corporation of Delaware
Filed June 30, 1966, Ser. No. 561,821
11 Claims. (Cl. 208—127)

ABSTRACT OF THE DISCLOSURE

High density fluid solids particles of large particle size are conveyed upwardly through an angle riser with minimum slugging by injecting gas in a portion of the riser less than about 4 riser diameters in length, under conditions whereby the superficial gas velocity in the riser is increased from less than about 0.4 ft./sec. to over about 20 ft./sec. The technique is especially useful in circulating fluid coke between a coker and a regenerator.

---

This invention relates to the transport to fluidized solids. More particularly, it relates to conveying fluid solids particles from a low elevation to a higher elevation smoothly and with minimal slugging and pressure surging.

It is known to transport solids particles having a particle size and density within a fluidizable range by conveying the solids in a gaseous fluid medium. Numerous treatises and publications describe fluid techniques for conveying solids. Successful operation of fluid solids processes, however, remains a black art. Some systems operate smoothly under one set of conditions while other apparently identical systems require a different set of conditions to function properly.

It has heretofore been the practice in conveying or lifting fluidizable solids, to smoothly or gradually accelerate the particles in a riser or conduit. This was done by uniformly spacing carrier gas injection points at locations along the length of the riser such that the particles velocity increases incrementally to the desired upward velocity, which may be from a few ft./sec. to several hundred ft./sec. Heretofore, it was generally believed that to inject all or a large portion of the carrier gas into one point or zone in the riser would cause slugging, i.e., the formation of large bubbles due to the concentrated gas charge separating dense zones or slugs of solids. Thus, it was thought that good gas dispersion could not be achieved if large quantities of gas were injected at any one point. While such a commonsense approach may be applicable to many situations and types of solids materials, it is indicative of the complexities of fluid solids processes that certain systems behave in a manner inconsistent with the accepted theories of the prior art.

One system where grave difficulties are encountered in solids conveying is in fluid coking processes. One such process is described in Phieffer et al. U.S. Patent 2,881,130. A typical fluid coking process employs a coking vessel or reactor and a burner or heating vessel. A hydrocarbon is introduced into the coking vessel into a bed of fluid coke at cracking temperatures ranging from about 900° to about 2800° F. The hydrocarbon cracks to liberate hydrogen and/or other light gases, depending on the reaction temperature. Carbon is deposited as coke on the existing particles of the fluid coke bed. The cracking reaction is highly endothermic and considerable quantities of heat must be supplied to maintain the process in thermal balance. A preferred means of supplying heat for the cracking reaction is to transfer coke particles from the fluid bed of the reactor and convey them to a burner through a series of angle risers and vertical risers.

In the burner the coke particles are heated generally to a temperature ranging from about 200° to about 400° F., or higher, above the temperature in the reactor. This can be accomplished by combusting a portion of the coke particles with an oxygen-containing gas such as air or by contacting the particles with the hot gaseous products obtained by combusting a fuel gas with oxygen or air. The heated coke particles are then conveyed back to the fluid bed of the reactor by means of transfer lines, risers, etc.

Operating difficulties are often encountered in the coke circulating system due to problems associated with the transfer of solids from the reactor to the heater and vice versa. The circulating system from the reactor to the heater consists generally of a standpipe and riser combination. The coke descends from the reactor into the standpipe, from which it is picked up by a carrier gas and conveyed through a riser generally extending vertically or at a relatively steep upward angle. The riser extends into the heater vessel. A similar arrangement of standpipe and riser is generally employed for the return of coke from the heater back to the coker.

The conventional method of adding carrier gas to riser systems to convey solids upwardly is, as described in the Phieffer et al. patent, supra, to inject carrier gas at various points spaced along the length of the sloping angle riser and at the bottom of the vertical riser. Employing such a technique generally causes slugging and large pressure surges. Generally, by trial and error, the carrier gas rate at each injection point is adjusted until a combination is found whereby slugging intensity is reduced to tolerable limits. The "optimum" gas rate at each inlet along the angle riser often is unique for each coking plant, even though the lines, velocities, particle sizes, etc., may all be apparently the same in different plants. In some cases twenty, or even more, carrier injection points are used along the length of the angle riser to distribute the gas evenly. Heretofore, it was believed that this was the only reasonable method of minimizing large gas bubble formation in the riser and the associated problem of slugging and pressure surging.

Even with numerous distributed gas inlets along the angle riser, large bubbles still tend to form, and the "optimum" conditions of gas rates and distributions still may produce slugging and surging. As a result, it has been customary, if not essential, in most coking processes to provide mechanical controls, such as slide valves, whereby large pressure differentials can be employed between different points in the fluid solids circulation system, e.g., reactor and heater, this serving to buffer the effects of slugging in the riser and also providing a positive mechanical means to prevent solids flow from reversing direction during extended periods of surging pressures. Often, without slide valves, in conventional riser systems it is even necessary to employ great excesses of carrier gas to dilute the solids in the riser to a point where slugging is not encountered, i.e., employing so much carrier gas that the solids-gas system is a disperse phase ranging from about 1 to about 5 pounds of solids per cubic foot of carrier gas.

In a system such as fluid coking, where thermal efficiency is critical to the economy of the process, the addition of large quantities of extraneous gas places an intolerable burden on the system heat balance, to say nothing of the expenses involved in providing and maintaining large compression and gas handling facilities.

These and other problems of the prior art fluid solids conveying techniques are alleviated, or even eliminated, by the use of the present invention.

This invention contemplates a method for lifting or conveying fluidized solids particles from an initial elevation to a higher elevation by means of a conduit or angle riser positioned at an angle ranging from about 45° to 75°, preferably 55° to 65°, from horizontal. The inlet or lower end of the conduit is located in or in communication with a feed zone or bed of the solids particles wherein the fluidizing gas superficial velocity is maintained at less than about 0.4 ft./sec., preferably about 0.2 to 0.4 ft./sec. Carrier or lift gas is introduced into the angle riser or conduit at a point or points in sufficient quantity to quickly increase the superficial gas velocity through the conduit from a velocity less than about 0.4 ft./sec. to a velocity above about 20 ft./sec. The velocity is increased through this range in a short portion of the conduit less than about 4 conduit diameters in length and preferably one to two conduit diameters in length to achieve optimum smoothness and minimum slugging or pressure surging. The superficial gas velocity is generally increased in said short portion of the conduit to a velocity of 20 to 50 ft./sec., or higher, preferably 30 to 40 ft./sec.

In accordance with the invention, it is important in most systems that the carrier gas be injected into the angle riser or conduit somewhat above the coke inlet or lower end of the angle riser. If the gas is injected too close to the lower end, some of it may go backwards into the feed zone, upsetting the solids flow and causing pressure surges, bubble formation, slugging, and generally unsmooth operations. The preferred level for the introduction of carrier gas into the angle riser will depend to a certain extent on various factors, including the pressure differential between the fluidized feed zone and the higher elevation, the total circulation rate, riser dimensions, etc. However, the most important variable affecting the selection of the level for injection of carrier gas is the range and duration of anticipated pressure fluctuations across the riser and control system.

Any fluid solids systems will tend to encounter some pressure fluctuations, even in normal and smooth operations. When a small surge of fluctuation occurs, it may tend to upset the solids flow. If the magnitude and duration of the upset is sufficient, it may force the solids in the angle riser back to the feed zone and the carrier gas will likewise be forced in the same direction, which will upset the feed zone fluidization conditions, this in turn creating further and larger pressure fluctuations. To prevent serious reversals without the necessity of using slide valves or other mechanical devices, it is important that for each pound/square inch of anticipated pressure fluctuation the angle riser carrier gas injection level be located at least 2 feet above the inlet of the angle riser. Thus, if fluctuations across the riser of about 2 p.s.i. are routinely encountered in normal operations, the portion of the angle riser where carrier gas is injected to rapidly increase the velocity should be at least 4 feet above the lower end of the riser. For most commercial fluid solids systems the optimum level for increasing the gas velocity by injection of carrier gas will be at least 1 foot, and generally about 2 to 6 feet, from the bottom of the angle riser.

The method of this invention is applicable to a wide selection of fluidizable solids. Especially significant advantages are achieved when the solids particles are substantially in the size range from about 40 to 600 microns, averaging about 100 to 200 microns, and having a particle density ranging from about 1.6 to 2.1 g./cc. Thus, the method is especially advantageous when used to convey coke particles in a fluid coking process.

The invention will be better understood by reference to the attached drawing, which shows a fluid coking process employing angle risers or conduits for circulating coke particles according to the method of this invention. Referring specifically to the drawing, a hydrocarbon feed is injected via inlet 11 into a fluidized bed of coke particles 12 in a coker reactor 13. The dense coke bed is maintained at a temperature of about 2000° F., to crack the hydrocarbon feed essentially to hydrogen and coke. The liberated coke deposits on the existing particles, enlarging them in size, while the hydrogen and unreacted feed gases exit through line 14 to a cyclone separator 15, from which product gases are withdrawn via line 17 and any entrained coke particles are returned to the reactor by means of standpipe 16.

To provide heat for the endothermic cracking reaction, coke particles are withdrawn from the reactor as a mildly fluidized column in standpipe 18. From the standpipe they are conveyed to an angle riser 20 via a connecting section 19. From the angle riser the solids ascend through vertical riser 21 into a transfer line heater 22, in which they are partially combusted with air injected through inlet 23 in an amount sufficient to heat the particles to about 2400° F. The heated particles then pass via elbow 24 and line 25 into cyclone 26, where they are separated from the gases. Flue gas exits from the cyclone through line 27. The heated particles descend from the cyclone through standpipe 28 and return to the reactor 13 through a riser system similar to that employed for transporting the solids from the reactor to the heater.

The coke particles are conveyed upwardly to the transfer line heater 22 by the injection of carrier gas at one or more points in the various transfer lines. The carrier gas can be, for example, air, steam or recycled product gases from outlet 17. A small quantity of fluidizing gas is injected at inlet 29 to provide a superficial gas velocity sufficient to maintain solids in standpipe 18 in a state of mild fluidization, the superficial velocity being, however, a maximum of about 0.4 ft./sec. A small additional amount of fluidizing gas can be injected into connecting section 19 by means of inlet 30, if required, to keep the particles feeding to the angle riser. If the connecting section is unduly long or otherwise restrictive, fluidizing gas will be required at inlet 30. Thus, it is desirable to keep the connecting section as short as possible. Preferably, the connecting section is eliminated and the angle riser is joined directly with standpipe 18. The solids flow rate into the bottom or inlet of the angle riser 20 will depend upon the differences in pressure between the transfer line burner 22 and the reactor 13. Generally, a pressure differential of only a few p.s.i., e.g., about 1 to 3 p.s.i., will be required to feed coke solids to the angle riser at preferred mass flow rates of about 12,000 to 20,000 lbs./min./ft.$^2$. The angle riser forms an angle with the horizontal between 45° and 75°, preferably 55° to 65°, for optimum flow conditions. Carrier gas is injected through inlets 31, 32 and 33 in an amount sufficient to provide a superficial gas velocity above 20 ft./sec. This sudden increase in carrier gas velocity takes place within a portion L of the angle riser not more than about 4 riser diameters long. Additional carrier gas can be added to the angle riser, e.g., at inlet 34, and still more gas can be injected via line 35 into the vertical riser. The optimum final superficial gas velocity will generally be between 20 and 50 ft./sec., preferably 30 to 40 ft./sec. Thus, it is unnecessary and usually undesirable to inject any significant quantities of additional carrier gas after the acceleration zone L.

Similar provisions (not shown) are employed to accelerate the gas rate in the angle riser returning heated coked particles to the reactor from cyclone 26.

Additional tests demonstrate how the method of this invention greatly reduces or eliminates slugging and pressure drop fluctuations in a fluidized solids system. Referring again to the attached drawing, when additional taps or inlets (not shown) are employed to inject carrier gas along angle riser 20 such that the acceleration of carrier gas through the 0.4 to 20 ft./sec. range takes place over a portion of the riser greater than about 4 diameters in length, slugging occurs, i.e., zones of dense solids, separated by zones of gas bubbles, form. Continuous measurement of the pressure drop through vertical riser 21 provides indications of the severity of the slugging. As shown in the following table, great improvement is achieved by operating the riser gas flow according to the method of this invention. To insure that pressure drop readings are unbiased, no carrier gas is injected into the vertical riser during the tests. Instantaneous pressure drops as low as 15 lbs./ft.$^2$/ft., and as high as 85 lbs./ft.$^2$/ft., are observed although the superficial gas velocity through the vertical riser is the same for all the tests.

TABLE I

| L[1] | H (ft.)[2] | Superficial Gas Velocity | | ΔP[3] |
|---|---|---|---|---|
| | | Angle Riser Inlet (ft./sec.) | Vertical Riser (ft./sec.) | |
| 1 | 2 | 0.3 | 22 | 23–33 |
| 2 | 2 | .3 | 22 | 22–33 |
| 4 | 2 | .3 | 22 | 23–32 |
| 6 | 2 | .3 | 22 | 18–82 |
| 10 | 2 | .3 | 22 | 15–85 |
| 2 | 2 | .6 | 22 | 15–75 |

[1] L=Length in riser diameters of the portion of the angle riser through which superficial gas velocity is increased from angle riser inlet velocity to 20 ft./sec.
[2] H=Height of gas acceleration zone above angle riser inlet.
[3] ΔP=Instantaneous minimum and maximum pressure drop through vertical riser per foot of riser height in lbs./ft.$^2$/ft.

Thus, as the above table indicates, the pressure drop fluctuates over a narrow and controllable range of only about 10 to 11 lb./ft.$^2$/ft. when the riser system is operated within the scope of this invention, while the pressure drop surges and fluctuates wildly (60 to 70 lb./ft.$^2$/ft.- when the gas rates are not controlled in accordance with this invention.

It is not intended that the invention be limited by the preceding examples and demonstrations, which are illustrative. Many other variations will be apparent to one skilled in the art.

This invention makes it possible to convey solids smoothly through a 45° to 75° angle riser without trial-and-error adjustments of gas rates. It also eliminates the need for slide valves or other mechanical devices in most processes by providing a riser system which is stable and relatively resistant to flow reversals. Further, it provides for high velocity conveying of relatively dense phase systems, which minimizes carrier gas requirements and enhances the overall process thermal efficiency. Thus, the invention provides both operational and economic advantages over the techniques of the prior art.

What is claimed is:

1. A method for conveying fluidizable coke particles from an initial elevation to a higher elevation which comprises forming a feed zone of said particles at said initial elevation, said zone having a superficial fluidizing gas velocity of less than about 0.4 ft./sec.,
   conveying particles from said feed zone upwardly to said higher elevation through a conduit positioned at an angle ranging from about 45° to about 75° from horizontal,
   introducing carrier gas into a portion of said conduit in an amount sufficient to increase the superficial gas velocity through said conduit from less than about 0.4 ft./sec. to above about 20 ft./sec., said increase in gas velocity taking place in a portion of the conduit less than 4 conduit diameters in length.

2. The method of claim 1 wherein said portion of the conduit is positioned at an elevation at least about 1 foot above the lower end of said conduit.

3. The method of claim 2 wherein said portion of the conduit is positioned between about 2 and 6 feet above said lower end.

4. The method of claim 1 wherein the superficial gas velocity in said conduit is increased to a velocity in the range from about 20 to 50 ft./sec.

5. The method of claim 4 wherein said superficial gas velocity is in the range from about 30 to 40 ft./sec.

6. The method of claim 1 wherein said portion of the conduit is about 1 to 2 conduit diameters in length.

7. The method of claim 1 wherein said conduit is positioned at an angle ranging from about 55° to about 65° from horizontal.

8. The method of claim 1 wherein the superficial gas velocity in the feed zone at said initial elevation ranges from about 0.2 to about 0.4 ft./sec.

9. In a fluid coking process wherein coke particles are circulated from a coker reaction zone through a heater vessel and returned to the reaction zone by means of transfer lines, the improvement which comprises withdrawing coke downwardly from said reaction zone, forming a lower zone of said particles having a superficial gas velocity of less than about 0.4 ft./sec.,
   conveying particles from said lower zone upwardly through an angle riser positioned at an angle ranging from about 45° to 75° from horizontal,
   introducing carrier gas into a portion of said angle riser in an amount sufficient to increase the superficial gas velocity through said angle riser from less than about 0.4 ft./sec. to above about 20 ft./sec., said increase in gas velocity taking place in a portion of the angle riser less than about 4 riser diameters in length,
   and passing said particles from the angle riser to said heater vessel.

10. The process of claim 9 wherein a pressure differential is maintained between said lower zone and said heater vessel ranging less than about 3 p.s.i.

11. The process of claim 10 wherein the coke particles are fed from said lower zone to the angle riser at mass flow rates in the range from about 12,000 to about 20,000 pounds/minute/ft.$^2$.

References Cited

UNITED STATES PATENTS

| 2,863,821 | 12/1958 | Dunlop et al. | 208—127 |
| 3,158,555 | 11/1964 | Tyson | 208—127 |
| 3,228,872 | 1/1966 | Metrailer | 208—127 |

FOREIGN PATENTS

| 596,466 | 4/1960 | Canada. |

HERBERT LEVINE, *Primary Examiner.*